Figure 1:
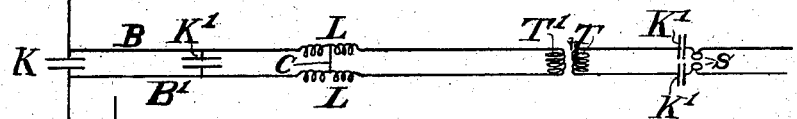

No. 730,246. PATENTED JUNE 9, 1903.
L. DE FOREST.
SPACE TELEGRAPHY.
APPLICATION FILED MAR. 8, 1902.
NO MODEL. 5 SHEETS—SHEET 1.

WITNESSES:
Jennie Reynolds,
H. L. Beil

INVENTOR
Lee de Forest,
BY
H. L. Reynolds.
ATTORNEY.

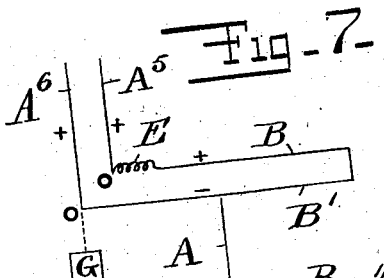
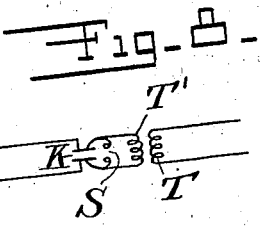
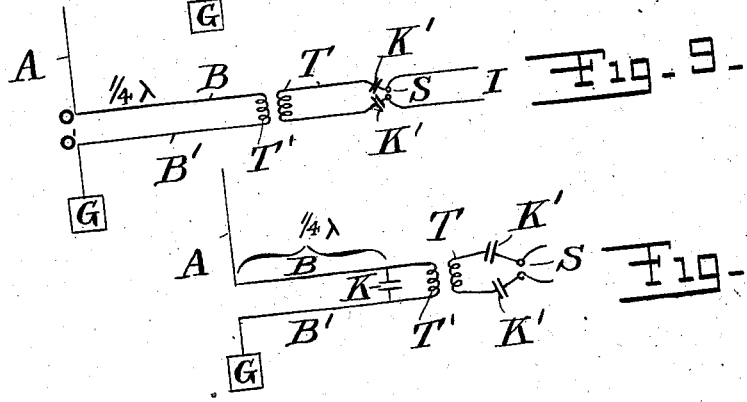
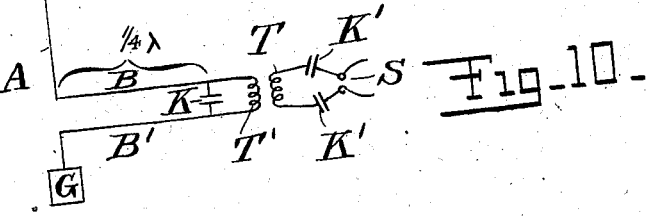
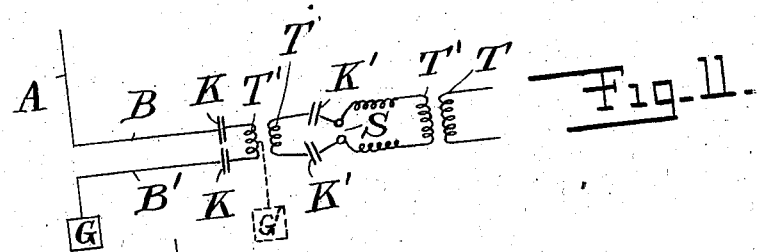
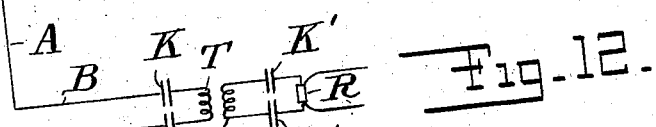
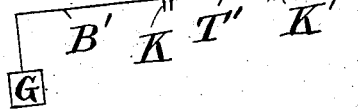

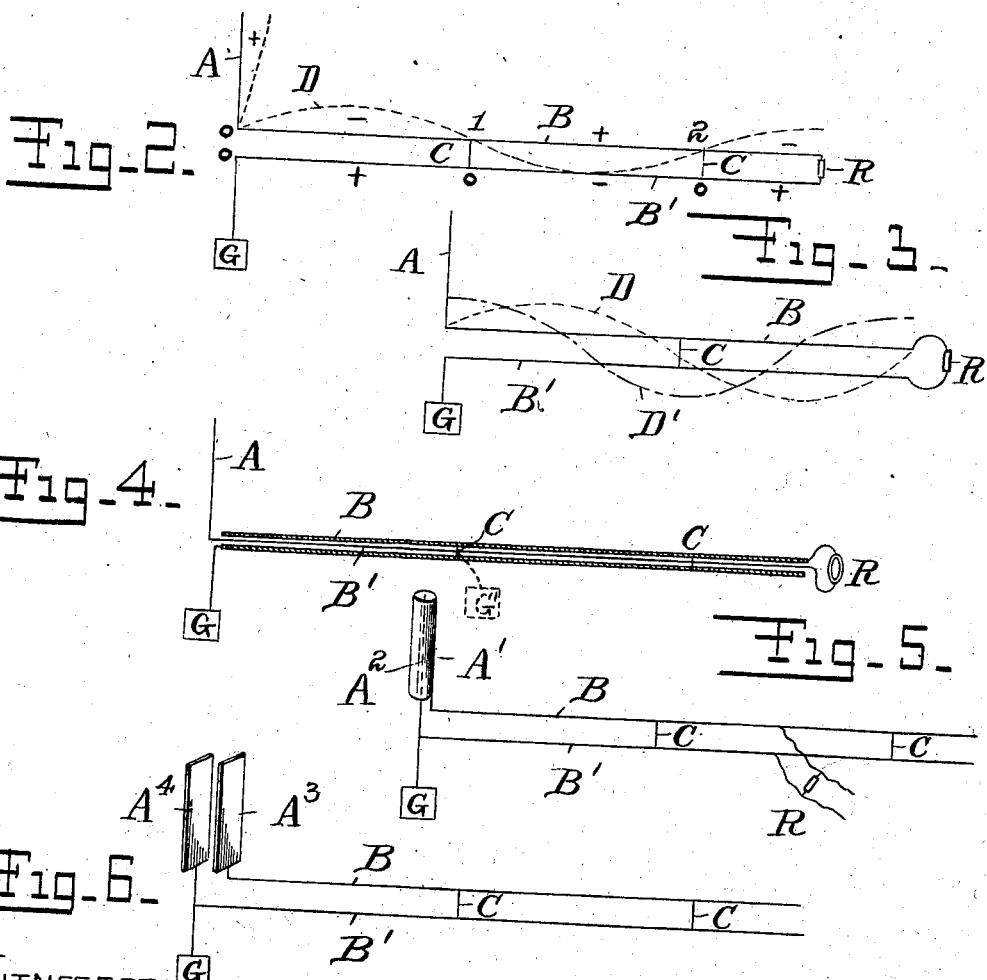

No. 730,246. PATENTED JUNE 9, 1903.
L. DE FOREST.
SPACE TELEGRAPHY.
APPLICATION FILED MAR. 8, 1902.
NO MODEL.
5 SHEETS—SHEET 5.
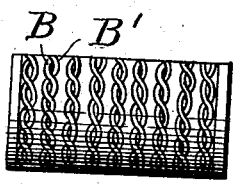
Fig. 18.
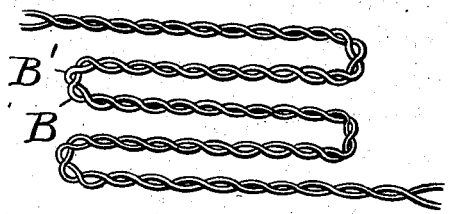
Fig. 19.
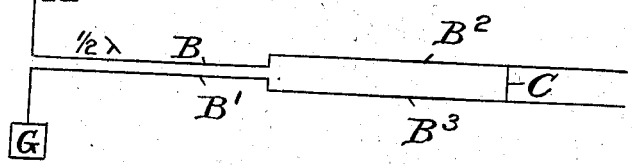
Fig. 20.
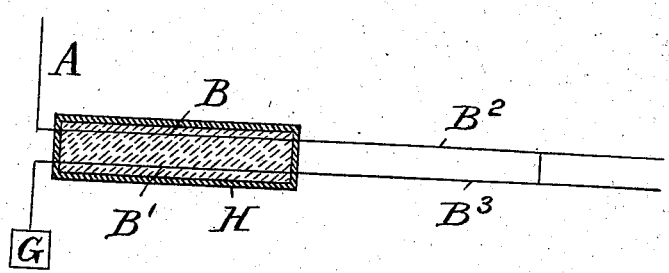
Fig. 21.
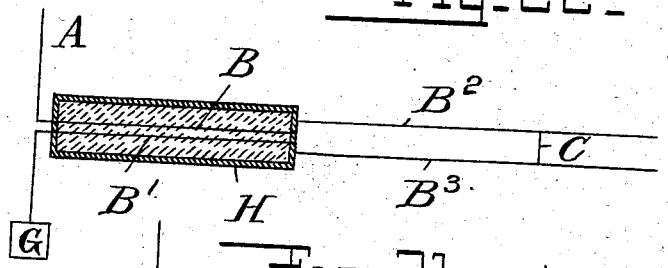
Fig. 22.
Fig. 23.
WITNESSES:
J. B. McGirr.
Henry L. Reynolds.
INVENTOR
Lee de Forest
by Gifford & Bull
attys.

No. 730,246. Patented June 9, 1903.

UNITED STATES PATENT OFFICE.

LEE DE FOREST, OF NEW HAVEN, CONNECTICUT, ASSIGNOR TO THE GREATER NEW YORK SECURITY COMPANY, OF NEW YORK, N. Y., A CORPORATION OF NEW YORK.

SPACE TELEGRAPHY.

SPECIFICATION forming part of Letters Patent No. 730,246, dated June 9, 1903.

Application filed March 8, 1902. Serial No. 97,239. (No model.)

*To all whom it may concern:*

Be it known that I, LEE DE FOREST, a citizen of the United States, and a resident of New Haven, in the county of New Haven, State of Connecticut, have invented a new and useful Improvement in Space Telegraphy, of which the following is a full, clear, and exact description.

My invention relates to improvements in those systems of electric signaling between two points which use natural media for the transmission of the electrical impulses and which are ordinarily referred to as "space" or "wireless" telegraphy.

My invention comprises certain novel features, which will be herein described, and particularly pointed out in the claims.

In the drawings accompanying herewith I have shown and in the specification have described numerous forms of apparatus in illustration of the manner of applying my invention to use and of adapting it to different circumstances and requirements. I am aware, however, that it may be embodied in other forms, and do not, therefore, wish to be understood as limiting myself to the forms herein shown, but seek to claim my invention in any form in which it may be embodied. The scope of my invention is to be determined by a reference to the accompanying description and particularly to the claims attached thereto.

The accompanying specification is a description of my invention as embodied in the figures of drawings given.

Figure 24:
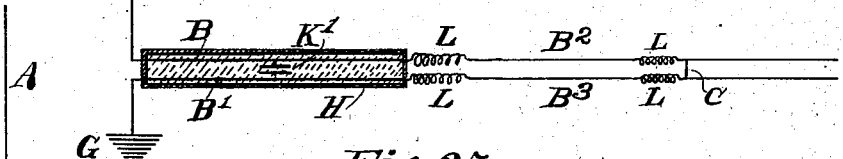
Figure 25:
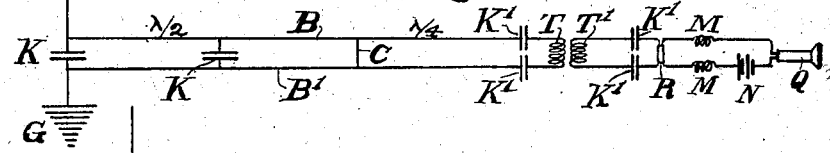
Figure 26:
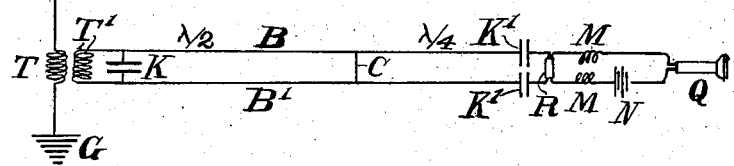

Figure 1 shows an apparatus embodying my invention used as a sender. Fig. 2 shows diagrammatically a simple form of apparatus containing my invention employed as a receiver. Figs. 3 to 7, inclusive, show modified forms, which by the use of either a responder or an energizing device may be used either as a sender or as a receiver. Figs. 8 to 11, inclusive, show my invention in various modifications employed as senders. Figs. 12 to 23, inclusive, show forms of my invention employed as receivers. Figs. 24, 25, and 26 show other arrangements of parts employed in my invention.

While I have shown and described some arrangements employed as receivers and others as senders, and while some of the arrangements shown are better adapted for the one use than for the other, there is in general nothing to forbid the employment of any of the arrangements shown in either capacity by substituting either a responder or an energizing apparatus for whichever of these is shown.

In systems of space or wireless telegraphy now being employed a failure to attain the efficiency or power desired is largely due to the fact that the electrical waves emanating from the sending device are rapidly damped or decreased in intensity or amplitude. In other words, while the maximum intensity or amplitude of the waves may be satisfactory their persistence is unsatisfactory, as they rapidly fall in amplitude to nothing. In consequence of this their energizing action upon the receiving-antenna being repeated but a few times does not have the cumulative energizing effect that a much weaker impulse would have if repeated a greater number of times. The effect is comparable to the effect produced upon a vibrant body, as a piano-wire, by its note being sounded loudly for a very short time or less loudly for a much longer time.

I have discovered a means whereby I am able to produce with each signal a longer and better-sustained series of waves, the same means also lending themselves readily to use in the receiver, in which use they have special and marked advantages.

It is a well-known fact that if two adjacent and parallel wires of equal length are connected each with a terminal of any form of apparatus producing electrical oscillations of high frequency the charges in said wires at any point of their length are of exactly equal intensity and of opposite phase. The currents flowing in these two wires are also at corresponding points equal in amount and flow in opposite directions. If these wires are the equivalent of one-quarter or any multiple thereof of the wave length of the electrical oscillations transmitted thereto, very efficient reflection occurs at the ends of these wires, with the result that stationary or standing waves are set up, caused by the incident and reflected oscillations. The system then divides up into quarter or half wave lengths with nodes and loops symmetrically situated on each wire. At the nodes of these electrostatic stationary waves a conducting-body, as a wire bridge, may be placed across both wires without seriously interfering with the action beyond. At a distance of one-quarter wave length from said nodes loops are formed, at which points the maximum possible difference of potential between the two parallel wires exist. Such a system of parallel conductors is known in the art as the "Lecher" system of wires. The phenomena involved in this system have been worked out theoretically, notably by Lord Rayleigh, Drude, Heaviside, and others, and have been set forth by these and other people, as in the following instances: By E. Lecher, in *Wiedemann's Annalen*, No. 41, page 850; Barton and Bryan, *Phil. Mag.*, August, 1897; E. Marx, *Wiedemann's Annalen*, No. 11, 1898; Lord Rayleigh, *Phil. Mag.*, No. 43, 1897; E. Lecher, *Wiedemann's Annalen*, No. 42; Heaviside, *London Electrician*, April 9, 1897; Bjerknes, *Wiedemann's Annalen*, No. 55, page 121. As has been pointed out by investigators, what is known as the "wire and sheath" return, consisting of a wire surrounded by a coaxial tubular conductor insulated therefrom, is only a special form of the Lecher system and is subject to the same laws as the simple system. The general theory has shown that in this Lecher system of conductors, or for a wire and its sheath return, the self-induction and capacity are evenly distributed and are reciprocals per unit length of the system— that is to say, the capacity and self-induction cancel each other as far as the dimensions of the wire are concerned; that the period of vibration is independent of the distance between the two wires and of their diameters. Such a system of conductors is known in the art as a "distortionless" circuit. The velocity of propagation thereon for high-frequency oscillations is approximately that of light. For example, this is the velocity when the resistance per unit length is negligible compared to the self-induction and when this self-induction is the reciprocal of the capacity per unit length. These conditions are satisfied when the wires are less than one-half millimeter in diameter and less than 100 meters long.

The formula for the self-induction per unit length of the Lecher system is $L = \text{Log. nat.} \frac{d}{r}$, where $d$ is the distance between the centers of the two parallel wires and $r$ their common radius. The expression for the capacity per unit length is the exact reciprocal of the above, or $S = \frac{1}{L}$, hence the remarkable property of the Lecher system that the velocity of the propagation of an electric wave along its length is independent of the size of the wires or of the distance between their centers, and this velocity comes out as equal to the velocity of light. This being the case it will be at once understood how the period of any section of a Lecher system embraced between two consecutive bridges is a function of the length between said bridges alone. Hence in arrangements shown in Figs. 20, 21, 22, and 24 the velocity of propagation along section B B′ is identical with that along section $B^2 B^3$, and if the length of these two sections is the same the period of oscillation of each section will be the same; but although the product (L S) be the same for both, L is small in B B′ and large in $B^2 B^3$, while S is large in B B′ and small in $B^2 B^3$. Now the relative quantities of electromagnetic and electrostatic energies depend wholly on the ratio of L to S. Where self-induction is large and capacity small, we will have a greater proportion of the total energy as energy of inertia or momentum. Where capacity is large and self-induction small, we will have a greater proportion of the total energy as energy of elasticity. Hence in passing from B B′ to the section $B^2 B^3$ we will have a transference of energy from the electrostatic to electromagnetic—for example, two opposite charges are traversing B and B′. When these pass upon $B^2$ and $B^3$, respectively, where the capacity is less, their potential difference must be increased, and vice versa.

On account of losses from resistance, leakage, and imperfect reflection at bridges or open ends in such a system of parallel wires as is here described the stationary waves set up therein are never perfect, and therefore absolute nodes are never found in practice, although with suitable reflecting devices the approximation thereto when a slowly-damped wave-train is transmitted is very good. We get instead points of maximum and minimum potential difference and of current, whose magnitudes are dependent on the coefficient of resistance, leakage, and reflection.

Ordinarily the order of magnitude of the energy involved in the two sets of waves (the electrostatic and electromagnetic) is the same, and if the parallel wires were infinitely small in diameter the magnetic force must equal the electric, and the greater the surface the less becomes the magnetic force relative to the electric, the one increasing as the other decreases.

The characteristics and advantages of the Lecher system are:

(a) It is to a high degree a resonant vibrator—that is, it has a very marked period of its own and is very little responsive to oscillations of any other frequency than its own.

(b) It is a poor radiator, and consequently a persistent vibrator, persisting for some time in its vibrations once they are set up, therefore producing a long wave-train and damping slowly. This is because most of the lines of force lie in the space between the two conductors, and the radiation losses are therefore small, except when a radiator is attached.

One authority states that the observable magnetic effect from a Lecher system, even strongly excited, does not extend beyond three centimeters from the parallel wires.

(c) By reason of the stationary waves set up higher potentials are obtained than are otherwise possible.

(d) The nodes and loops of these stationary waves are fixedly located, thus enabling connections to be made with the wires at any phase of the wave desired.

(e) The system may be easily and accurately tuned to any frequency desired.

(f) It is simple in its mathematical and theoretical aspects. Its constants are easily calculated and regulated, so that the dimensions of a system for securing definite results may be readily predetermined. This has not yet been satisfactorily done for other forms of apparatus employed in connection with currents of very high frequency, such as are employed for space-signaling. The velocity of transmission in a simple Lecher system is approximately equal to that of light. Therefore the wave lengths or frequency may be readily determined and exactly defined. A brief description of the phenomena and laws obtaining in such a system of parallel conductors has been given by me in the *American Journal of Science* for July, 1899.

I have discovered that these characteristic features of the Lecher system of wires render them especially adaptable for use in wireless telegraphy. In their application they are flexible, being adaptable to various modifications as may be required by the various circumstances, as the type of transmitter or receiver employed and the practicable dimensions of the apparatus, as the height and character of the upright wire.

In the figures of the drawings accompanying herewith I have shown various modifications in which the Lecher wires are employed, some representing the sending apparatus and others the receiving apparatus, although in general either a sending or a receiving apparatus may be employed with either.

In Fig. 2 I have shown Lecher wires B B' in use with a receiver, one wire, B, connected with an upright wire or antenna A and the other, B', connected with the ground G or other capacity. The equivalent length of the upright wire or collector A is one-quarter of the wave length of the natural oscillation to which the system is attuned. At a distance of one-half wave length from the foot of the upright, as at 1, occurs the first node, and if the wires are long enough other nodes are formed separated by the same distance as the node 2 shown in the figure. At these nodes the wires may be connected by no-resistance bridges, as C C, without destroying or seriously affecting the oscillations or the propagation of the waves. These bridges may also be grounded, as shown by dotted lines at G' in Fig. 4, without affecting the period of vibration.

If the wires be continued one-quarter wave length beyond the last node, as shown in Fig. 2, a loop of electrostatic force will be formed by the open-end reflection. At such open ends all the energy of the system is electrostatic. Therefore, as the sensitive device operated by a difference of potential across its terminals, such as a coherer or other responder, may be inserted most advantageously at a static loop, these ends form a desirable location for such a device. The dotted lines D, Figs. 2 and 3, indicate the position and intensity of such waves in the system. In Fig. 2 a responder is shown at R as inserted between the open ends of the Lecher wires. Such a device may, however, be inserted wherever an electrostatic loop occurs. A sensitive device operated by current or electromagnetic stationary wave, such as a bolometer or thermo element, should be placed at the loop of an electromagnetic wave. The electromagnetic waves do not coincide in location with the electrostatic waves, but, as is well known in the art, are separated along the wire by ninety degrees or by a quarter-wave length. The relative positions of these different waves are shown in Fig. 3, in which the dotted line D represents the electrostatic wave, and D' the electromagnetic wave. A bolometer or other device operated by current or electromagnetic waves may be located at any loop of an electromagnetic wave. Such a device is shown at R' in Fig. 3.

Since the simple antenna A is a strongly-damped vibrator and the system of parallel wires attached at its base a weakly-damped or strongly-resonant vibrator, it sometimes results that a violent oscillation received by the antenna, if strongly damped, may excite in the parallel conductors vibrations having the distinctive period of said conductors, regardless of the period of the exciting impulse. Were this exciting impulse, however, a long wave-train, interferences in the parallel wires would arise and the effect above described could not obtain. Conversely, if this long wave-train have the frequency to which the wire system is attuned this latter would be violently excited. Thus by regulating the sensitiveness of the receiving device R response to oscillations other than those to which the system is attuned may be prevented.

In Fig. 4 the wire and sheath return is shown, wherein, as in the Lecher wires, the self-induction and capacity are also evenly distributed. This, as shown, consists of a central conductor, as a wire B', and an outer tubular conductor B surrounding it. These two conductors may be connected at the location of electrostatic nodes by bridges, as C. As shown in Fig. 4, the waves travel upon the outer surface of the inner conductor and back on the inner surface of the tubular or outer conductor. The connections, however, of the antenna and the ground may be reversed, or we may regard the annular space between the two conductors as the region within which the etheric vibrations are confined. A responder, coherer, or other equivalent device is shown as located at R, the same being at an electrostatic loop.

In Fig. 5 the wires B and B' are simple Lecher wires, such as described in connection with Fig. 2. The antenna A of Fig. 2 is, however, replaced by the conductive cylinder A', connected with wire B and the central wire $A^2$, which latter is connected with the wire B'. These form a wire and sheath return system employed as a radiating or a receiving antenna. This is only an exemplification of the wire and sheath return employed as an antenna. When used as a radiating antenna and ground connection made to the inner conductor, as G, the field of force is divided, part lying between the exterior of conductor A' and the ground and the greater portion concentrated in the annular space between the coaxial conductors A' and $A^2$. This arrangement results in a conservation of force, only a small portion of the energy being radiated outward at each oscillation, but these oscillations are continued for a considerable time. When used as a receiver, the sensitive device, if of the type of the responder, should be located at a static loop, as shown at R.

In Fig. 6 the conductors B B' are the simple Lecher conductors, one of them being connected with the ground G. The simple antenna is replaced by two plates $A^3$ and $A^4$, which may be considered simply as an extension of the Lecher conductors. If the planes of these two plates be parallel and adjacent, the greater part of the energy is concentrated in the field therebetween. The region lying in front of $A^4$ will at one instant be occupied by lines of force representing, say, a positive wave, and that behind $A^3$ will at the same instant be occupied by lines of force representing a negative wave. The respective lines of force radiating from these plates are constantly changing their sign, oscillating from one to the other, but are always of opposite sign in the respective regions and at points the same number of wave lengths distant from their respective plates. In the region of the plane parallel with these plates the radiation will be comparatively small and consist equally of radiations from both plates. The waves in this region will thus neutralize each other, and a receiver located in such region will be little affected. From the fact that one plate, as $A^4$, is grounded it results that the waves received thereby are dissipated to earth direct, thus preventing that condenser action by which the intensity of its charge is built up and lines of force established between the plate and the earth. The plate $A^4$ being connected with the earth there is no difference of potential between this plate and the earth, and therefore no connecting lines of force. For these reasons radiations therefrom are comparatively slight. The region of strongest propagation is therefore outward from $A^3$, and, as the plate $A^4$ tends to absorb the lines of force which proceed in its approximate direction, the direction of strongest propagation is perpendicular to its plane. This feature enables the direction of propagation of the effective energizing or signaling waves to be in a measure controlled or directed or, in other words, provides for the maintenance of a neutral zone or zones. If these plates be mounted so as to be rotatable upon a common axis, the position of these neutral zones may be controlled, and the same apparatus may thus be utilized for signaling in any direction desired, while approximately non-effective in other directions. This fact may also be utilized in preventing interference between different apparatus located in a common field of energy which would otherwise interfere with each other. When used as a receiving antenna, the rotative plates may be utilized for receiving messages coming from a given direction, while in considerable measure neutralizing or cutting out the waves coming from other directions. It follows that if the device has a direction of maximum propagation and directions of minimum or no propagation it will conversely have directions of maximum and minimum sensitiveness to the reception of waves, from which it follows that if more than one series of waves are coming in it will be most responsive to those which come from its direction of maximum efficiency, and also by turning the plates to the position where the message is most clearly received the plate $A^3$ will be found to be facing the direction from which the impulses are received. In this way the direction from which a signal comes may be approximately told.

If it is desired that both antenna be charged alike instead of oppositely, as may at times be desirable to secure increased radiating or collecting power, this result may be obtained by inserting between the base of one and the leg of the Lecher system connected thereto a retarding device, such as a coil or length of wire equivalent in length to one-half wave length of the oscillation for which the system is attuned. Such a coil is shown at E in Fig. 7. If used as a receiver, a wave traveling down the antenna $A^5$ will be delayed by its passage through the coil E by a time equal to one-half its period, and so will enter upon its arm of the Lecher wires at a time when a wave of opposite sign enters upon the other arm of the Lecher system. Thus the necessary condition of waves of opposite sign in the Lecher system is fulfilled.

In Figs. 8, 9, 10, and 11 means are shown for exciting my apparatus or for transmitting thereto the electrical oscillations necessary when employed as a sender. These figures do not show all the means which may be employed for this purpose, but are given as illustrative of well-known means which adapt themselves to this use.

In Fig. 8 a "static" method of charging is shown. The parallel or Lecher wires are shown as of only one-half wave length. Inserted in the bridge across their ends is a condenser K. In shunt around this condenser are a spark-gap S and the secondary coil T' of a transformer T T'. When this condenser is charged to the breaking-down point of the spark-gap S, a discharge occurs at this point, and this serves as a connecting-bridge between the parallel wires, and these wires are set in vibration as a Lecher system. Part of the energy is reflected back at O and O', forming stationary waves with nodes at O and O'. A part goes into the upright conductor or antenna A and is radiated outward.

In Figs. 9, 10, and 11 the Lecher system is charged inductively—that is, the secondary T' of the transformer is in the circuit of the Lecher system and oscillates therewith, while in Fig. 8 it is not in such circuit and does not enter directly in its oscillations. In fact, in Fig. 8 the transformer may be replaced by any source of electrical energy giving the requisite potential.

In Fig. 9 the parallel wires are shown as equal to one-quarter wave length, and the coil T', forming the secondary of the transformer, is equivalent to one-half wave length. The primary coil T of this transformer is connected in series with condensers K' and spark-gap S. This primary system is charged from any suitable source of energy I. It is necessary that the self-induction of the primary coil T and the capacities K' be so chosen that the natural period of oscillation of this primary system is equal to that of the adjoining Lecher system.

Fig. 10 shows a system essentially the same as that shown in Fig. 9, except that a condenser K is connected to the Lecher wires at the static loop. A condenser so located is the equivalent of a certain length of parallel wires, so that a system containing the condenser vibrates with a period of one having longer wires or reduces the length of wire necessary for a system of a given period. The effective capacity of such a condenser depends somewhat upon its location in the stationary wave, it being most effective when located at a static loop—viz., at a point where the potential difference across its terminals is maximum.

It has been observed that a capacity or condenser located across the two Lecher conductors exerts a greater or less distorting or absorbing effect upon the wave system, according as it be located near an electrostatic loop or near a node. If near a loop, the potential difference across its terminals is greater. Hence the quantity of electricity capable of being stored thereby is correspondingly greater, and the effect of this storing up at such a point is proportional, therefore, to the location of the condenser in the Lecher system. In other words, while the absolute capacity is independent of this location its effective or equivalent capacity is dependent thereon.

Figure 17:
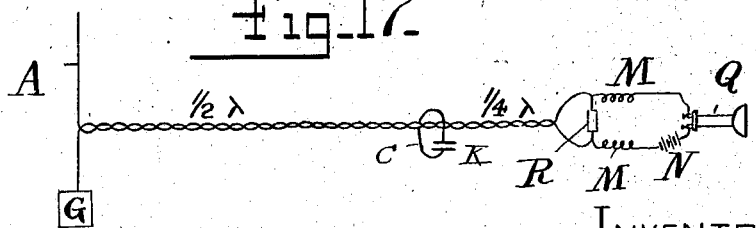

The use of a condenser as a means for adjusting the period or equivalent length of a system, for which purpose it is most effectively placed adjacent a static loop, should be distinguished from its use in a bridge to prevent direct connection between the wires, as is shown at K in Figs. 1, 17, and 25, where it is located at a static node. In this position it acts as a bridge, while at the same time insuring the transfer to the system beyond the bridge of a larger percentage of the energy than would a plain wire bridge or direct connection. It is, however, not altogether devoid of an effect in lengthening the period of the system. Condensers may be employed for both of these purposes in the same system, as is shown in Figs. 1 and 25.

Fig. 11 shows the Lecher wires cut at static loop and a condenser inserted in such cut between the Lecher wires and the secondary terminals of the transformer. Here also the armatures of the condenser behave as the equivalent of a certain length of wire, this relation depending upon the amount of surface in the condensers and the distance between the armatures. This affords a ready means of attuning the system by changing the distance between the armatures of the condensers. Since the maximum potential of opposite sign occurs at the terminals of the secondary T' of the transformer, the middle point of the coil must be one of zero potential and may therefore be grounded, as shown at G, without interrupting the action of the system.

If the devices shown in Figs. 10 or 11 are used as receivers, the transformer-coils T and T' should be reversed in arrangement, as shown in Fig. 12, the low-potential coil T being connected with the Lecher wires, and the receiving instrument or responder R may be substituted for the spark-gap S. The same necessity arises in this case as in the sender for tuning alike the two circuits shown.

Figure 13:
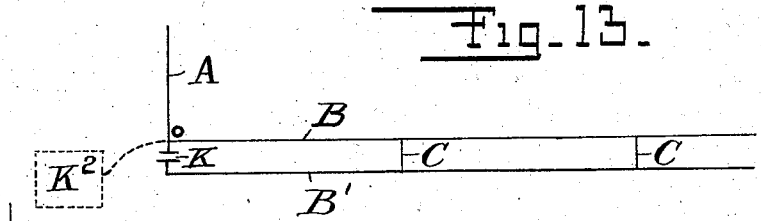

In the receiver it is not always necessary to ground any point of the Lecher system of wires. In Fig. 13 if a node be formed, as at O, at the base of the upright A stationary waves will be set up in the parallel wires, as before, and in the absence of any earth connection the energy of the oscillations has no opportunity to leak away and must be consumed only in heat and reflection losses in the receiver instruments. To insure the formation of a node at O, a large capacity, as $K^2$, may be connected at this point. If a condenser, as K, be connected at O between the two wires, its capacity should be small. A condenser at this point in the system shown acts as a bridge.

Figure 14:
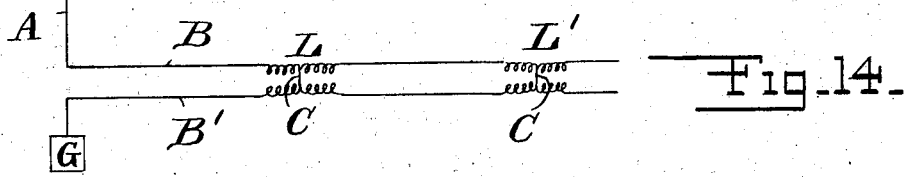

In Fig. 14 is shown a method of reducing the actual length of wires required to form the equivalent of the proper wave length, which consists in inserting coils L L' in the wires of the Lecher system. These coils should be inserted at loops of current where their inductive or impedance effect will be maximum. If the Lecher wires are to be bridged, these bridges should connect the middle points of two corresponding coils, as shown at C.

In Fig. 1 I have shown a system which employs both inductance-coils L and a condenser K' as lag-producing or period-adjusting devices. I also show a condenser K employed as a bridge at the base of the antenna. The bridge C, which connects the two inductance-coils, might be of the same form. The wave-producing device is of the same construction and is connected with the system in the same manner as that shown in Figs. 9 and 10.

The use of bridges at the nodes of wires of more than one-half wave length and placing the receiving instrument beyond said bridge or bridges has one advantage. The bridge, if grounded, will have the effect of leading off or grounding waves of such length that their nodes are formed elsewhere and will thus screen or protect the responder or equivalent receiver from the effect of all waves except those which are of the length for which the apparatus is adjusted. Upon waves of the proper length the bridges produce but little effect of this character.

Figure 15:
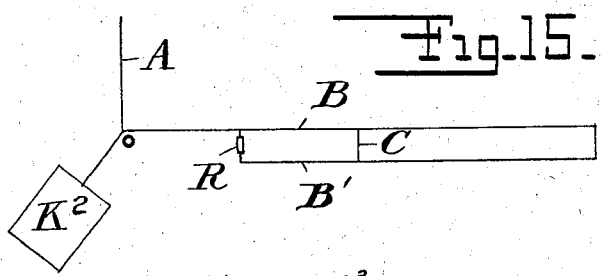
Figure 16:
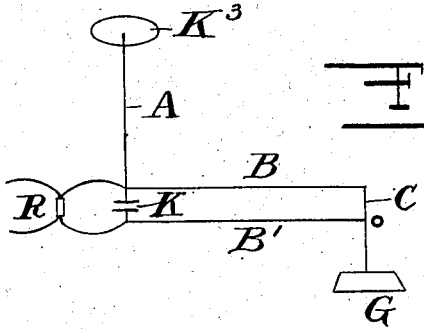

It is not always necessary that the two parallel or Lecher wires be of the same length. Fig. 15 shows an arrangement in which the responder R is located at a static loop of the wires and one-quarter wave length removed from the base of the upright wire. At this point in the lower wire we have a static loop formed by open-end reflection. The node at O may be connected to earth or to a capacity $K^2$.

In all the foregoing figures the upper end of the upright wire has been considered as the location of the static loop, of which the node was at the base one-quarter wave length below it. If a body having a large capacity, as $K^3$ in Fig. 16, be located at the top of the upright wire or antenna, its capacity may be such as to produce reflection in the waves oscillating in the upright conductor equivalent in sign to the reflection obtained at a bridge in the Lecher wire system. This means that a static node will be formed at this point with a loop at the lower end. The earth connection then should be at a point along the parallel wires one-quarter wave length distant from the base of the upright wire or antenna, where the second node will be located. As the capacity $K^3$ makes a static node at the top of the antenna where ordinarily is a static loop, the location of the condenser K corresponds with a static loop. The condenser K of Fig. 10 is also at a static loop. In both cases the condenser represents or absorbs a certain amount of the wave length and is so located as to shorten the apparent wave length of the Lecher system. The condenser K in Fig. 1 shortens the length necessary in B B', and consequently also shortens the length necessary in A to still keep A in resonance with the attached Lecher system. The responder may be located, as shown, in shunt around the condenser.

In Fig. 17 is shown a convenient form of using the Lecher wires. Here the two wires, which are insulated, are twisted together, forming a twisted pair, the distance between them being regulated by the thickness of the insulation. It is desirable that the pitch of the twist be not too steep. The twisted pair is well adapted to use upon a spool or coiled in any other manner which may be desirable to economize space or to secure portability. If the two simple parallel wires untwisted were coiled upon a spool, with convolutions parallel and near together, interference by induction between adjacent convolutions would arise; but when closely twisted such adjacent convolutions of the coil if not too close together will not interfere with one another. In any considerable length of the convolution one wire will first lie adjacent to another carrying current of like sign and then to one carrying current of opposite sign, so that for any considerable length of wire the inductive effects from the two wires in the convolutions adjoining will be neutralized. In practice I have successfully used such wires twisted with a pitch equal to three turns to the inch wound upon a spool about three inches in diameter with successive turns separated about an eighth of an inch. Their use is not, however, limited to even a near approximation to the above proportions, which are given only to show what has been found successful without any intention of limiting myself thereto.

So far as I am aware such a method of embodying the Lecher wires and of utilizing their advantages has never before been used. It retains practically all the theoretical advantages of the straight parallel wires embodied in a compact form, which makes the apparatus portable and practical. Wherever in the accompanying drawings or description straight Lecher wires are shown or described, it is to be understood that the twisted pair, as above described, may be substituted, either coiled, as shown in Fig. 18, or disposed in any suitable way—for instance, as in Fig. 19. Bridges, a condenser, or any other device such as described in connection with the previous features may be inserted as desired and are controlled in location and action by the same principles as apply to the simple straight wires. In Fig. 17 a responder R, choke-coils M M, a battery N, and a telephone Q, or other indicating instrument are inserted in a local circuit after the manner common in wireless-telegraph apparatus.

As shown in Fig. 17, the responder is placed across the open end of a loop and one-quarter wave length distant from the responder, and one-half wave length distant from the upright A is or may be placed a bridge C. To avoid shunting the local circuit about the responder, which would occur if a no-resistance bridge or a metallic connection were used, a condenser K is placed in the bridge, which condenser is of sufficient capacity to act as a no-resistance bridge for the Hertzian oscillation, while forming an effective interruption for the local current.

When employed in the sending device, it may be desirable for purposes of insulation to immerse the entire system in oil.

In Figs. 20, 21, and 22 are shown constructions by which the potential may be simply and effectively transformed either to raise or lower it, as desired. The principle therein illustrated may be employed either in the sender or the receiver, but is more especially recommended for use in the receiver.

The general theory shows that the mutual induction of the Lecher wires decreases as the two parallel wires are brought closer together, becoming zero for the wires in actual contact, and that conversely the capacity of the system is thus increased. Consequently if one system of such parallel wires, as B B', Fig. 20, of length equivalent to one-half wave length of the vibration transmitted be added to another system, as $B^2 B^3$, of the same period of electrical vibration, but having its two parallel wires farther apart, then this second system $B^2 B^3$ may take up the impulse transmitted from the first system unaffected as to its period of vibration, yet transformed to a wave of higher potential, but of correspondingly-diminished magnetic energy or current. On the same principle if the first-mentioned system—say of one-half wave length—have for the dielectric between its two parallel wires a substance of higher specific inductive capacity than that between the two parallel wires of the second system then the capacity of the first system per unit length is greater than that of the second system. The electrical energy will therefore be transferred from the first to the second system, altered in its relative proportions of electrostatic and electromagnetic energies. So in the arrangement last described the transformation will be, as before, to step up the potential and to diminish the currents flowing in the second system. Such a system is illustrated in Fig. 21, in which the wires B B' are parallel throughout their length; but the first half-wave length from the upright is inclosed in a casing H, containing oil. Thus I employ one pair of parallel wires—for example, of length equivalent to a half-wave length of the vibration transmitted—immersed in and separated by an oil, and connected to one end of this system another system of parallel wires of a length also equivalent to one-half wave length, but equally separated by air or by a dielectric of small specific induction capacity, and thus obtain between the two wires of this second system a higher difference of potential than existed between the wires of the first system. Such immersion in a fluid may result in a change in the wave length required for a given period. In Fig. 22 a combination of both plans is shown, the first half-wave length B B' being immersed in oil and also having its wires closer together than the second half-wave length $B^2 B^3$, which are separated only by air.

When desirable to still further increase the self-induction of one of such systems of parallel wires as I have described, I may insert at corresponding points in each of the two wires inductive or momentum coils of suitable impedance and construction, as shown at L L, Fig. 24. Similarly, to increase the capacity of the other system I may attach to each of the parallel wires thereof an armature of a condenser of suitable area, as shown at K', Fig. 24.

Such combination of systems as I have here described thus affords a step-up or step-down device entirely differing from "transformer-coils," ordinarily so called, a device novel and useful in its application to the art of space-telegraphy.

In all the figures so far mentioned the antenna is shown as directly connected with what may be called the "resonant" conductors—that is, with the parallel conductors which produce the stationary waves. This is, however, not a necessity, as the resonant conductors and the antenna may contain devices in circuit therewith whereby the wave effect is transmitted inductively. Such a construction is shown in Figs. 23 and 26, in which T T' represent the two coils of a transformer or induction-coil, one being in the circuit of the resonant conductors B B' and the other in the circuit of the antenna. When applied to a receiving device, the coil T is the primary coil and T' the secondary. When applied to a sending device, they would be reversed in position or function. This method of connecting the parallel conductors and the antenna may be employed in the forms illustrated in the other figures. As shown in these figures, the conductors extending each way from the center of the coil T' to the first bridge C or the point where the first node is formed are each the equivalent of a half-wave length, the condensers K, if employed, being taken into consideration. The condenser may, however, be dispensed with and its effect produced by employing some other form of lag-producing device, such as impedance-coils, after the manner illustrated in Fig. 14 or the conductors B B' lengthened to the proper amount. The indirect or inductive method of connecting the antenna with the parallel or Lecher conductors may be employed generally with the devices shown in the other figures in lieu of the direct connection shown therein. Wherever in the description or claims one form of connection is specified, I am to be understood as stating or claiming the other form to be an equivalent therefor.

In Fig. 25 the last system with which the receiver-circuit is connected is inductively connected with the other systems after the manner shown in Fig. 12.

In Figs. 25 and 26 condensers K' K' are shown as placed in and forming part of the conductive systems after the manner shown in Figs. 11 and 12.

In Fig. 26 the antenna is directly connected with the ground G and inductively with the resonant system by the coils T T', as described in connection with Fig. 23.

In the foregoing description I have endeavored to describe such modifications and variations in the apparatus which may be employed as will make clear the principles of my invention without intending to show all the modifications which are available or feasible. Other combinations will suggest themselves to one familiar to the art.

I am not to be understood as limiting myself to the forms or exact combinations of various elements shown, as I am aware of other modifications and combinations which might be employed. The further multiplication of the drawings seems, however, to be unnecessary, as those given serve to clearly set forth the principles of my invention.

The scope of my invention is to be determined by reference to the claims terminating this specification, in which the omission in any claim of any element or the failure to include therein any qualification of an element is to be understood as a distinct statement that such element or qualification is not essential to that particular combination.

Having thus fully described my invention, I claim as new and desire to secure by Letters Patent—

1. In an apparatus for space telegraphy, in combination, an antenna and two parallel conductors adapted to act inductively upon each other, one of which is electrically connected with the antenna, said conductors being each equivalent to a multiple of a quarter-wave length.

2. In an apparatus for space telegraphy, in combination, an antenna and a plurality of parallel conductors coöperating therewith and adapted to develop stationary electrical waves.

3. In an apparatus for space telegraphy, the combination with an antenna of two conductors each equivalent in length to a multiple of a quarter-wave length and adapted to the production in each other of stationary electrical waves.

4. In space telegraphy, in combination, parallel conductors adapted to the production of stationary electrical waves, and an antenna connected to one of the conductors whose natural period of vibration corresponds to that of the parallel conductors.

5. In space telegraphy, in combination, parallel conductors adapted to the production in each other of stationary electrical waves, and an antenna connected at a node of said waves to one of the conductors and having a natural period of vibration corresponding to that of the parallel conductors.

6. In space telegraphy, in combination, plural conductors adapted for the production of stationary electrical waves, bridges connecting said conductors at points corresponding with the nodes of said waves, and an antenna connected with one of the conductors.

7. In space telegraphy, in combination, plural conductors adapted for the production of stationary electrical waves, bridges connecting said conductors at points corresponding with the nodes of said waves, ground connections for said bridges and an antenna connected with one of the conductors.

8. In space telegraphy, in combination, a plurality of mutually-inductive conductors adapted for the production of stationary electrical waves, an antenna connected to one of said conductors and a receiver located at a loop of said stationary waves.

9. In space telegraphy, in combination, a plurality of mutually-inductive conductors adapted for the production of stationary electrical waves, an antenna connected to one of said conductors at a node of said waves, and a receiver located at a loop of said waves.

10. In wireless telegraphy, the combination with an antenna, of two conductors of substantially uniform separation, one of said conductors being connected with the antenna.

11. In wireless telegraphy, the combination with an antenna of two conductors of substantially uniform separation, one of said conductors being connected with the antenna, and tuning or period-adjusting devices connected with said conductors.

12. In space telegraphy, in combination, an antenna, two conductors adapted to the production of stationary waves, one of said conductors being connected with the base of the antenna and a condenser between the base of the antenna and the other of said conductors.

13. In space telegraphy, in combination, an antenna, two parallel conductors connected at one end and having a condenser between their other or open ends, and an antenna connected with the open end of one conductor.

14. In space telegraphy, in combination, an antenna, two parallel conductors connected at one end and open at the other, and an antenna connected to the open end of one conductor, the joint lengths of said conductors being equivalent to a multiple of one-quarter of the wave length for which the antenna is adapted.

15. In space telegraphy, in combination, an antenna, a conductor consisting of a wire and sheath return having one end of the sheath connected with the antenna, and the corresponding end of the wire connected with a capacity.

16. In space telegraphy, in combination, an antenna, a conductor consisting of a wire and sheath return having an end of one of said members connected with the antenna.

17. In space telegraphy, in combination, an antenna, a conductor consisting of a wire and sheath return having one end of one of said members connected with the antenna, said wire and sheath return being equivalent in length to a multiple of a quarter-wave length.

18. In space telegraphy, in combination, an antenna, a conductor consisting of a wire and sheath return connected with a capacity, said wire and sheath return being equivalent in length to a multiple of a quarter-wave length.

19. In space telegraphy, the combination with parallel conductors forming a resonant system, an antenna connected with one end of said system, and means connected with the said conductors for the production therein of stationary electrical waves, of a capacity connection between said conductors adapted to lengthen their period of vibration.

20. In space telegraphy, the combination with parallel conductors forming a resonant system, an antenna connected with one end of said system, and means connected with the said conductors for the production therein of stationary electrical waves, of a capacity connection thereto adapted to lengthen their period of vibration.

21. In space telegraphy, the combination with parallel conductors forming a resonant system, an antenna connected with one end of said system, and means connected with the said conductors for the production therein of stationary electrical waves, of a capacity connection between said conductors adjacent to a static loop of said waves.

22. In space telegraphy, the combination with an antenna and two parallel conductors adapted to form a resonant system, one of which conductors is connected with the antenna, of condensers inserted between said parallel conductors.

23. In space telegraphy, the combination with an antenna and two parallel conductors adapted to form a resonant system, one of which conductors is connected with the antenna, of condensers inserted between said parallel conductors at points corresponding substantially with the loops of the electrostatic waves therein.

24. In space telegraphy, the combination with an antenna and two parallel conductors adapted to form a resonant system, one of which conductors is connected with the antenna, of lag-producing devices connected with such parallel conductors.

25. In space telegraphy, the combination with an antenna and two parallel conductors adapted to form a resonant system, one of which conductors is connected with the antenna, of lag-producing devices connected with such parallel conductors, and means for adjusting said devices to control the amount of lag produced thereby.

26. In space telegraphy, the combination with an antenna and two parallel conductors adapted to form a resonant system, one of which conductors is connected with the antenna, of condensers connected with said conductors and having their poles adjustable toward and from each other.

27. In space telegraphy, in combination an antenna, parallel conductors connected therewith and adapted to the production of stationary waves, and a condenser between the ends of said conductors.

28. In space telegraphy, in combination, an antenna, a conductor connected therewith and adapted to the production of stationary waves, a condenser between the ends of said conductor and a wave-indicating device connected in shunt about said condenser.

29. In an apparatus for space telegraphy, in combination, an antenna and two parallel and mutually-inductive conductors, one of which is electrically connected with the antenna and a wave-indicating device between said conductors.

30. In an apparatus for space telegraphy, in combination, an antenna, two parallel and mutually-inductive conductors one of which is electrically connected with the antenna, said conductors being each equivalent to a multiple of a quarter-wave length, and a wave-indicating device connecting said conductors at a point equivalent to a multiple of a quarter-wave length distant from said antenna.

31. In an apparatus for space telegraphy, in combination, an antenna, a plurality of parallel conductors coöperating therewith to develop stationary electrical waves, and a wave-indicating device placed in the field of said waves substantially at a loop thereof.

32. In an apparatus for space telegraphy, the combination with an antenna, and two parallel conductors each equivalent in length to a multiple of a quarter-wave length and adapted to the production of stationary electrical waves, and a wave-indicating device connecting said conductors at a point corresponding substantially with loops of said waves.

33. In space telegraphy, in combination, a plurality of conductors adapted for the production of stationary electrical waves, bridges connecting said conductors and located substantially at nodes of said waves, an antenna connected with one of the conductors and a wave-indicating device connected with said conductors substantially at a loop of said waves.

34. In space telegraphy, in combination, a plurality of conductors adapted for the production of stationary electrical waves, an antenna connected with one of the conductors, bridges connecting said conductors and located substantially at nodes of said waves, and a wave-indicating device connected with said conductors substantially at a loop of said waves and beyond a bridge from the antenna.

35. In space telegraphy, in combination, an antenna, a conductor consisting of a wire and sheath return having the wire and sheath connected one with the antenna and the other with a capacity and a wave-indicating device connected between the wire and sheath.

36. In space telegraphy, in combination, an antenna, a conductor consisting of a wire and sheath return, one of which is connected with the antenna and a wave-indicating device connected between the wire and its sheath.

37. In space telegraphy, in combination, an antenna, a conductor consisting of a wire and sheath return, one of which is connected with the antenna and a wave-indicating device connected between the wire and its sheath, at a point corresponding substantially with the loop of the waves in said conductor.

38. In space telegraphy, in combination, an antenna, a conductor consisting of a wire and sheath return, one of which is connected with the antenna, said wire and sheath return being equivalent in length to a multiple of a quarter-wave length, and a wave-indicating device connected between the wire and its sheath.

39. In space telegraphy, the combination with parallel conductors, means connected therewith for the production in said conductors of stationary electric waves, of a capacity connection between said wires adapted to lengthen their period of vibration, and a wave-indicating device connected between said wires.

40. In space telegraphy, the combination with parallel conductors, means connected therewith for the production in said conductors of stationary electrical waves, a capacity connection between said wires adjacent the static loop of the waves in said conductors, and a wave-indicating device connecting said conductors adjacent a static loop of the waves therein.

41. In space telegraphy, the combination with an antenna and two parallel conductors which are connected at one end one with the antenna and the other with the earth or other capacity, and a wave-indicating device connected between said conductors.

42. In space telegraphy, the combination with an antenna and two parallel conductors, one of which is connected with the antenna, of condensers inserted between said parallel wires, and a wave-indicating device in shunt about said condensers.

43. In space telegraphy, the combination with an antenna and two parallel conductors which are connected at one end, one with the antenna and the other with the earth or large capacity, and a wave-indicating device connected between said conductors at a point along the wires substantially corresponding to a loop of the wave with which it is designed to operate.

44. In space telegraphy, the combination with an antenna and two parallel conductors, one of which is connected with the antenna, a lag-producing device operative upon said conductors, and a wave-indicating device connected with such conductors.

45. In space telegraphy, the combination with an antenna and two parallel conductors, one of which is connected with the antenna, of lag-producing devices operative upon said conductors, means for adjusting said devices to control the amount of lag produced thereby, and a wave-indicating device connected with said conductors.

46. In space telegraphy, the combination with an antenna and two parallel conductors, one of which is connected with the antenna, of condensers connected with said conductors and having their poles adjustable toward and from each other, and a wave-indicating device connected with said conductors.

47. In space telegraphy, the combination with an antenna, two parallel conductors, one of which is connected with the antenna, of a condenser connected between said conductors substantially at an electrostatic loop of the waves therein, and a wave-indicating device connected between said conductors substantially at a loop of the electrostatic wave therein.

48. In space telegraphy, an antenna, a conductor connected therewith and adapted to the production of stationary waves harmonizing in period with those of the antenna, a wave-indicating device connected with the conductor, and connections with said conductor between the wave-indicating device and the antenna adapted to remove from the conductor such waves as are not in harmony with its designed period.

49. In a sending apparatus for space telegraphy, the combination with a wave-producing device and an antenna, of a conductor connecting the wave-producing device and the antenna and equivalent in length to a multiple of a quarter-wave length, and a second conductor parallel thereto and acting inductively to produce stationary electrical waves.

50. In a sending apparatus for space telegraphy, the combination with a wave-producing device and an antenna, of parallel conductors connecting the wave-producing device and the antenna and equivalent in length to a multiple of a quarter-wave length, and bridges connecting said parallel conductors substantially at nodes of the waves produced therein.

51. In a sending apparatus for space telegraphy, the combination with a wave-producing device and an antenna, of parallel conductors connecting the wave-producing device and the antenna and equivalent in length to a multiple of a quarter-wave length, bridges connecting said parallel conductors substantially at nodes of the waves produced, and ground connections for said bridges.

52. In space telegraphy, the combination with a wave-producing device and a radiating antenna, of a plurality of conductors connecting the wave-producing device and the antenna and the other acting inductively therewith to produce stationary electrical waves.

53. In space telegraphy, the combination with a wave-producing device and a radiating antenna, of a plurality of parallel conductors each equivalent in length to a multiple of a quarter-wave length, said conductors being adapted to the production of stationary vibrations, one of said conductors connecting the wave-producing device and the antenna.

In testimony whereof I have hereunto affixed my signature in the presence of two witnesses.

LEE DE FOREST.

Witnesses:
H. L. REYNOLDS,
ADOLPH FUCHS.